Aug. 11, 1959 W. P. EWALD 2,898,806
POLARIZING FILTER FOR STEREO PROJECTOR
Filed April 9, 1957 3 Sheets-Sheet 1

William P. Ewald
INVENTOR.

BY
ATTORNEYS

Aug. 11, 1959  W. P. EWALD  2,898,806
POLARIZING FILTER FOR STEREO PROJECTOR
Filed April 9, 1957  3 Sheets-Sheet 2
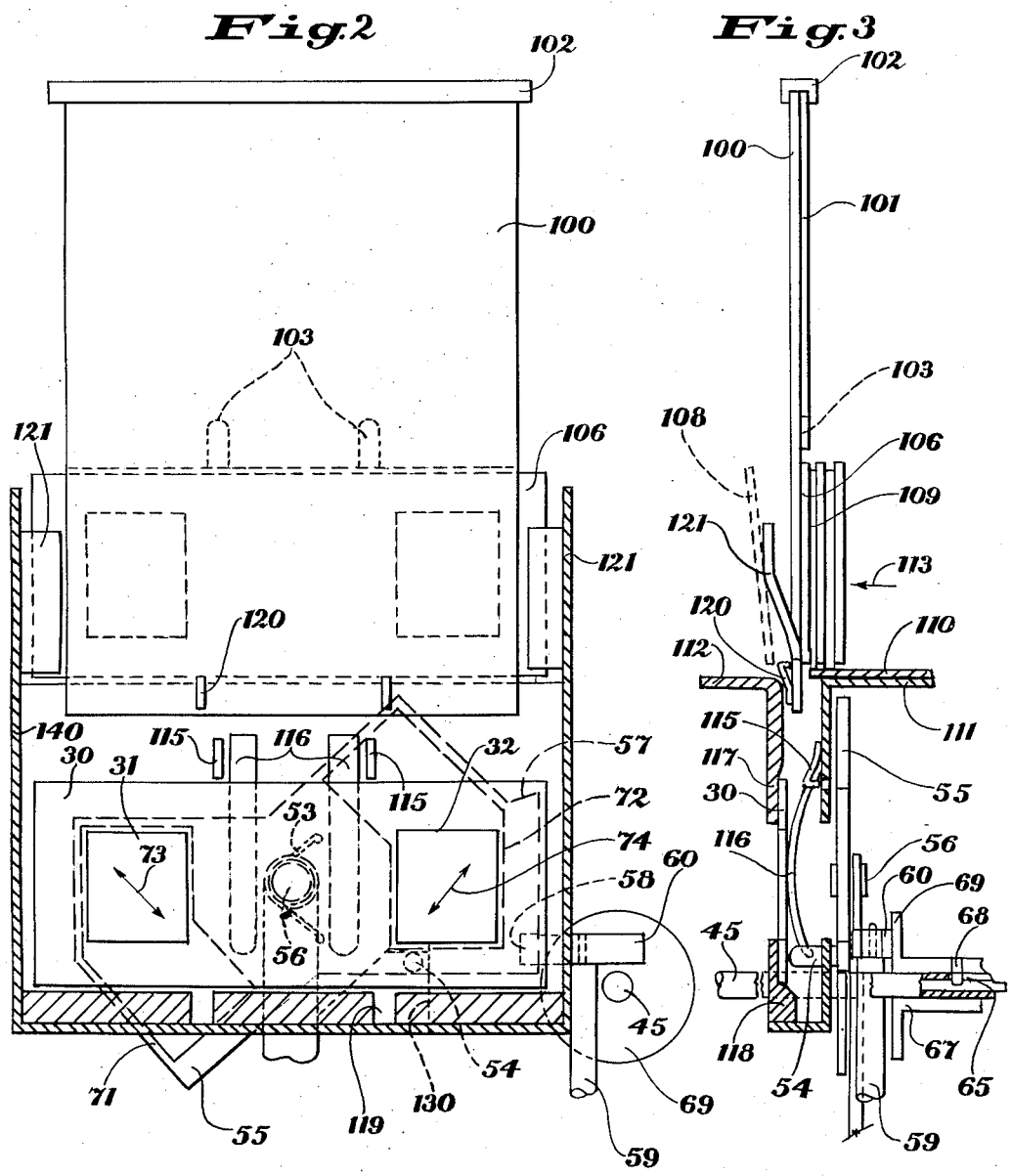
William P. Ewald
INVENTOR.

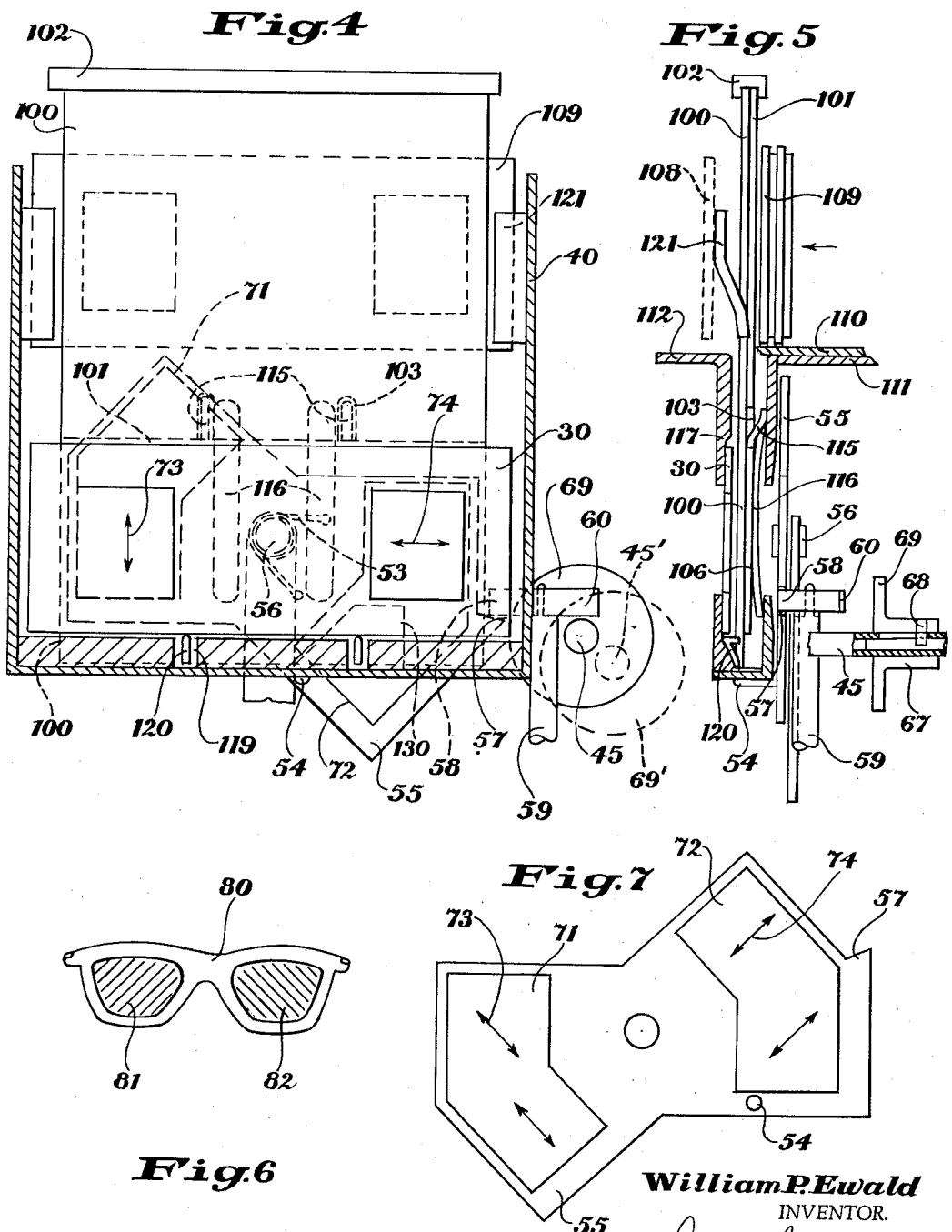

United States Patent Office 2,898,806
Patented Aug. 11, 1959

2,898,806

POLARIZING FILTER FOR STEREO PROJECTOR

William P. Ewald, Rochester, N.Y., assignor to Eastman Kodak Company, Rochester, N.Y., a corporation of New Jersey Application April 9, 1957, Serial No. 651,669

2 Claims. (Cl. 88—26)

This invention relates to optical systems for the projection of stereo slides such as those made with a twin lens camera. Reference is made to my co-filed application Serial No. 651,668 on a lens adjusting mechanism for such a projector.

The present invention relates particularly to the arrangement of polarizing filters employed in such projectors to provide the anaglyph effect necessary for separating the images when viewing.

If a pair of stereo images are projected onto a screen and are viewed through suitable anaglyph filters, the stereo effect is very pleasing, provided the images are in proper register. On the other hand, there is considerable eye strain if the images are out of register particularly vertically or divergently. The tolerances for lack of vertical register or for lack of horizontal register are fairly well understood although they are different for different people. If one attempts to register the two images properly while viewing them stereoscopically, two very objectionable things happen. In the first place, the audience and the operator suffer eye strain during the time the registration is being made. Secondly, it is very difficult if not impossible to make the necessary adjustment since the operator cannot tell easily just what is wrong with the adjustment or whether he is making the adjustment in the right direction.

According to the present invention, the anaglyph effect and hence the stereo effect is fully removed while the adjustment is being made. Thus, both eyes see both images and can easily detect the absence of proper register and can also easily detect what adjustment ought to be made to bring the images into proper register. Furthermore, there is no eye strain present when viewing both images with both eyes. The images merely appear as two images out of register.

In practice the operator removes the anaglyph effect by a special mechanism discussed in detail below, at the time a slide is inserted into the slide place of the projector. The operator then decides on a center of interest in the picture and brings the two images of this point into register upon the screen. This point will appear "at" the screen when later viewed stereoscopically. All images will now be in register vertically, but will be separated horizontally in proportion to the "depth." The operator then introduces the anaglyph effect, as discussed below and the audience sees the projected image stereoscopically without any eye strain. The whole operation of inserting a slide, adjusting the register and introducing the anaglyph filters normally requires about one second, particularly if the adjusting mechanism is of the type described in my co-filed application mentioned above and the trigger for releasing the anaglyph filter is mounted on the same adjusting mechanism.

The essential feature of the present invention is the arrangement of a polarizing filter consisting of a pair of sheet polarizers in a unitary mount with their planes of polarization mutually at right angles. Each of the polarizers is considerably larger than the light beam passing through the transparencies. The filter is rotatable through an angle of about 45° bringing a different area of each polarizer into alignment with the lenses of the projector. The rotation of the filter, rotates the plane of polarization of each polarizer. The filter is rotatable about a line which is parallel to axes of the two lenses and which, in order to keep the size of the filter small, is located somewhere between the lenses. The filter is rotated from a "position one" in which the planes of polarization of the two polarizers are both at 45° to the mutual plane of the lens axes, to a "position two" in which the planes of polarization are respectively parallel and perpendicular to this mutual plane of the lens axes. The spectacles worn by the observers normally have their planes of polarization at 45° to the horizontal and hence the observer sees the stereo effect when the polarizing filter in the projector is in position one, but both eyes of the observer see both images when the projector filter is in position two.

Other objects and advantages of the invention will be apparent from the following description when read in connection with the accompanying drawings in which:

Figs. 2 and 3 are vertical sections from the front and side of a slide changing mechanism for use in the projector shown in Fig. 1 and for operating the polarizing filter thereof; the filter is shown in "position one" and a slide is being projected;

Figs. 4 and 5 are similar vertical sections with the filter in "position two" and a slide about to be removed and replaced by another slide;

Fig. 6 illustrates the spectacles worn by the observer; and

Fig. 7 is a front view of the polarizing filter itself.

Figure 1:
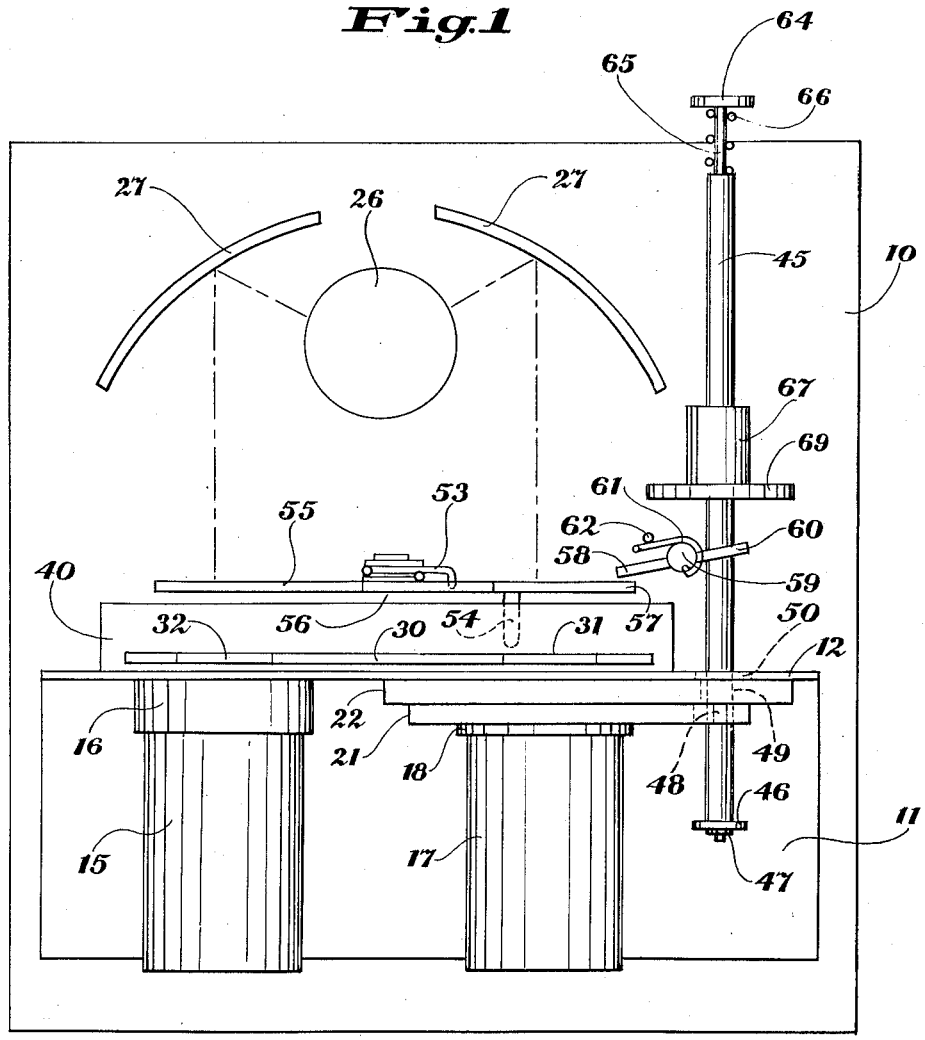
Fig. 1 is a schematic plan of a projector incorporating the present invention.

In Fig. 1 a base 10 carries a lens support 11 having vertical rear wall 12 on which the lenses are mounted. One of the lenses 15 is attached to this wall 12 directly by a ring member 16. The other lens 17 is attached by a ring 18 to a movable plate 21. A pair of movable plates 21 and 22 couple the lens 17 to the vertical wall 12 and permit transverse adjustment of the lens 17 (without rotation) relative to the lens 15. This transverse adjustment is produced by a toggle rod or joy stick 45 pivoted at the point 47 which is fastened by a vertical member 46 to the support 11. The rod 45 engages the plate 21 as indicated at 48 and is free to move horizontally and vertically with respect to the plate 22 and the wall 12 by means of apertures 49 and 50 respectively in the latter.

A lamp 26 with reflectors 27 illuminates stereo transparencies 31 and 32 in a stereo slide 30 mounted in the slide plane aligned with the lenses 15 and 17.

In Fig. 1 the housing for the slide changing mechanism is shown at 40. The preferred form of the invention has a fairly elaborate changing mechanism for moving the polarizing filter from one position to the other. In the arrangement shown, a filter 55 is mounted rotatable about a point 56. That is, it is rotatable about a line through the point 56 parallel to the axes to the lenses 15 and 17. The filter, particularly as shown in Figs. 2, 4 and 7 includes the mount 55 and two sheet polarizers 71 and 72 with their planes of polarization mutually at right angles as shown by the double headed arrows 73 and 74. The filter is urged by a light spring 53 into the position shown in Fig. 2. In this position the planes of polarization 73 and 74 are both at 45° to the horizontal, i.e. 45° to the mutual plane of the axes of the lenses 15 and 17, when in their normal position; vertical adjustment of the lens 17 tilts the mutual plane a negligible amount but the planes of polarization stay at 45° to the horizontal.

According to the invention generally, means are provided for moving the filter from this position to the one shown in Fig. 4 in which the axes 73 and 74 are respectively perpendicular and parallel to the horizontal.

According to a preferred form of the invention, this movement from the position of the filter shown in Fig. 2 to the position shown in Fig. 4 is accomplished automatically as each slide is inserted into the slide plane. In the particular arrangement shown, insertion of a slide (and incidentally removal of the next slide) involves lowering a plate 100 back of the slide 30 which is in the slide plane. The bottom of the plate 100 engages a lug 54 which extends forward from the filter mount 55. It moves this lug 54 from the position shown in Fig. 2 to the lower position shown in Fig. 4. The accompanying 45° rotation of the filter mount 55 moves the mount 55 past a latch 58 and, in the position shown in Fig. 4, allows the latch 58 to engage a latching surface 57 which may be a pin, a notch or a protuberance on the mount 55. This holds the filter in the position shown in Fig. 4, against the urging of the light spring 53.

The latch 58 is pivoted on a rod 59 which is rotatable in the base 10. A light spring 61 engages a detent 60 on the base 10 and urges the post 59 to rotate in the direction which causes the latch 58 to press lightly against the filter mount 55 or, in the position shown in Fig. 4, to move over the notch 57 to hold the filter mount cocked.

The filter is held cocked in the position shown in Fig. 4 after the slide 100 is removed and until the lens 17 is adjusted to provide proper registration of the images at the screen. This adjustment is provided, as mentioned above, by moving the rod 45 and hence the plate 21 to the desired position. Both images are seen by both eyes during this adjusting operation. The operator then presses a button or trigger 64 on the end of the rod. This button is held out either by a supplementary spring 66 or by the pressure of the spring 61 through the rod 59 and end 60 of the latch engaging a disk 69. This disk 69 is carried on a sleeve 67 on the outside of the rod 45. A screw 68 extends through a longitudinal slot in the hollow rod 45 and engages the solid rod 65 which when the button 64 is pressed moves back and forth inside the rod 45. As the rod 65 is moved forward by slight pressure on the button 64, it moves the sleeve 67 and the disk 69 forward engaging the end 60 of the latch. This causes the latch 58 to disengage from the notch 57 allowing the filter mount to snap back to the position shown in Fig. 2 under the urging of the spring 53.

The reason for using a relatively large disk 59 is shown in Fig. 4. The toggle rod 45 is moved during adjustment of the lens 17 and may assume the position shown by broken lines 45'. The disk 69 which is now in the position 69' still engages the end of the latching mechanism.

The operation of the slide inserting mechanism shown in Figs. 2 to 5 inclusive will now be described for completeness but the particular form of such mechanism is not an essential feature of the present invention. A metal slide 100 is provided with a handle 102 on the upper end thereof and a plate 101 which is thick enough for the end thereof to engage one slide 106 but not the next slide 109 in a stack of slides urged toward the plate 100 as indicated by the arrow 113. This stack of slides is carried on a plate 110 which is spring urged toward the plate 100 so that only one slide 106 can pass between the plate 100 and the slide 110, but so that the slide 110 can move back if a second slide happens to get caught at this point. The base of the slide magazine is shown at 111 and 112. As the slide 100 is moved down from the position shown in Figs. 2 and 3 to the position shown in Figs. 4 and 5, it carries the slide 106 with it. This pushes the catch springs 115 and also the main slide springs 116 back until the slide 106 is under the catches 115. Areas 103 of the plate 101 are cut away to allow the catches 115 to engage the upper end of the slide 106 to prevent it being withdrawn as the slide 100 is later raised.

Also, the plate 100 carries small catch springs 120 down behind the slide 30 which is in the slide plane and into spaces 119 provided near the bottom of the housing. The spring catches 120 then move under the slide 30, preparing to raise it as the metal slide 100 is withdrawn. This withdrawing action carries the slide 30 upward. The slide is tipped forward by members 121 engaging the ends of the slide and moves to the position shown by broken lines 108.

At the same time the next slide 106 is pushed forward by the springs 116 into the proper slide plane. The slide is held against the front wall 117 and is properly oriented vertically by the sloped part 118 at the bottom of this wall 117.

As shown in Fig. 3, the slide 30 is in front of the filter lug 54 during projection. Part 130 of the slide changing mechanism housing is cut away to permit the lug 54 to move back and forth between its two positions. As the slide 100 comes down engaging this lug 54 it cocks the filter mount 55 so that it stays in the position shown in Fig. 4 as the slide 100 is removed. Thus, the new slide 106 has a chance to move into the film plane before the lug 54 gets in the way. Incidentally, if the filter is not properly cocked, the pressure of the spring 53 is not sufficient to cause any trouble; the lug 54 merely stays under the slide mount until the slide moves out of contact therewith. After the filter is cocked the slide moves into the projection plane. The lenses are then adjusted as discussed above and the trigger 64 is then pressed releasing the filter allowing it to move back to the position shown in Fig. 2.

As pointed out above, the preferred form of the invention utilizes this automatic cocking of the filter and the convenient location of the release mechanism, but the invention is not limited to these preferred features. The two position, unitary mount, rotatable filter with oversize polarizers is the essential feature.

When the filter is released and moves back to the position shown in Fig. 2, the planes of polarization 73 and 74 are at 45° to the horizontal and at 90° to the planes of polarization of the right and left eye filters 81 and 82 of spectacles 80 (Fig. 6) worn by the observer. This produces the stereo effect in the well known way.

I claim:

1. An optical system for projecting a stereo slide comprising a pair of juxtaposed lenses, means for holding a stereo slide in a slide plane with its transparent pictures aligned respectively with the lenses, means for illuminating the pictures so aligned, a polarizing filter consisting of a pair of sheet polarizers in a unitary mount with their planes of polarizaion mutually at right angles, means for rotatably supporting the mount with an area of each polarizer respectively aligned with the lenses and rotatable about a line between, and parallel to the axes of, the lenses, through approximately 45° from a position one in which the planes of polarization are both substantially at 45° to the mutual plane of the lens axes to a position two in which the planes of polarization are respectively substantially parallel and perpendicular to said mutual plane, each sheet polarizer being in alignment with its respective lens at both position one and position two, means for urging the filter mount toward position one, latch means for holding the mount cocked in position two and for releasing it to move to position one, means for successively inserting slides into and removing slides from said slide plane and means, operated by said inserting and removing means, for cocking the mount in position two as each slide is inserted into the slide plane.

2. An optical system for projecting a stereo slide comprising a pair of juxtaposed lenses, means for holding a stereo slide in a slide plane with its transparent pictures aligned respectively with the lenses, means for illuminating the pictures so aligned, a polarizing filter consisting of a pair of sheet polarizers in a unitary mount with their planes of polarization mutually at right angles, means for rotatably supporting the mount with an area of each polarizer respectively aligned with the lenses and rotatable about a line between, and parallel to the axes of, the lenses, through approximately 45° from a position one in which the planes of polarization are both substantially at 45° to the mutual plane of the lens axes to a position two in which the planes of polarization are respectively substantially parallel and perpendicular to said mutual plane, each sheet polarizer being in alignment with its respective lens at both position one and position two, means for urging the filter mount toward position one, latch means for holding the mount cocked in position two and for releasing it to move to position one, a toggle rod for transversely adjusting one of the lenses relative to the other for stereo registration of the projected images and means on the toggle rod for releasing said latch means.

References Cited in the file of this patent

UNITED STATES PATENTS 2,746,345    Graves _____ May 22, 1956

FOREIGN PATENTS 732,730    Great Britain _____ June 29, 1955